US005173590A

United States Patent [19]

Nakano et al.

[11] Patent Number: 5,173,590

[45] Date of Patent: Dec. 22, 1992

[54] METHOD AND APPARATUS FOR CONTROLLING BILL CONVEYANCE IN AUTOMATIC TELLER MACHINE

[75] Inventors: Takemasa Nakano; Takahiro Fujii, both of Seto, Japan

[73] Assignee: Hitachi, Ltd., Tokyo, Japan

[21] Appl. No.: 592,285

[22] Filed: Oct. 3, 1990

[30] Foreign Application Priority Data

Oct. 13, 1989 [JP] Japan ................................ 1-264909

[51] Int. Cl.[5] ........................ G06F 15/30; B07C 5/00; B65H 1/00

[52] U.S. Cl. ...................................... 235/379; 902/12; 902/13; 209/534

[58] Field of Search ...................... 235/379; 902/9, 12, 902/13, 14; 209/534; 221/112, 116; 271/9, 163, 298; 222/9, 197, 297; 453/16, 18, 29, 17

[56] References Cited

U.S. PATENT DOCUMENTS 4,511,794 4/1985 Imamichi .......................... 209/534
4,524,268 6/1985 Fukatsu ............................ 209/534
4,625,870 12/1986 Nao et al. .......................... 235/379
4,653,647 3/1987 Hashimoto ......................... 209/534
4,697,708 10/1987 Goto et al. ........................... 902/12
4,747,492 5/1988 Saito et al. .......................... 209/534
4,775,783 10/1988 Sasaki et al. ........................ 235/379
4,787,518 11/1988 Yuge et al. .......................... 209/534
4,795,889 1/1989 Matuura et al. ..................... 209/534
4,866,254 9/1989 Okayama et al. ..................... 235/379
4,905,840 3/1990 Yuge et al. .......................... 209/534

FOREIGN PATENT DOCUMENTS 184569 12/1987 Japan .

*Primary Examiner*—John W. Shepperd
*Assistant Examiner*—Tan Nguyen
*Attorney, Agent, or Firm*—Antonelli, Terry, Stout & Kraus

[57] ABSTRACT

In a bill conveyance control method for an automatic teller machine including a plurality of a bill storage boxes for storing bills of predetermined same denomination, the plurality of bill storage boxes are used uniformly.

8 Claims, 6 Drawing Sheets

METHOD AND APPARATUS FOR CONTROLLING BILL CONVEYANCE IN AUTOMATIC TELLER MACHINE

BACKGROUND OF THE INVENTION

The present invention relates to an automatic teller machine, and in particular to a bill conveyance controlling method and apparatus for controlling stacking of bills into a plurality of bill storage boxes which store bills of the same denomination, and separating bills from these bill storage boxes.

In conventional automatic teller machines, denominations of bills stored in a plurality of bill storage boxes can be arbitrarily set by using preset switches as described in JP-A-62-184591. As a result, a plurality of bill storage boxes storing bills of the same denomination can be installed.

In the conventional technique, stacking bills into a plurality of bill storage boxes set for the same denomination or separation of bills from these bill storage boxes is performed as hereafter described.

In stacking bills into bill storage boxes, a bill storage box wherein bills should be first stored is predetermined and bills are first stored into this bill storage box. When this bill storage box becomes full, switching to another bill storage box is performed and bills are stored into this other bill storage box.

In separating bills from bill storage boxes, a bill storage box wherefrom bills should be first separated is predetermined and bills are first separated from this bill storage box. When this bill storage box becomes empty, switching to another bill storage box is performed and bills are separated from this other bill storage box. In case a plurality of bill storage boxes are specified for the same denomination, bills are not stacked in other bill storage boxes until one bill storage box becomes full. As for separation of bills, bills are not separated from other bill storage boxes until one bill storage box becomes empty. Therefore, the prior art has a problem that the frequency of use of bill storage boxes set for the same denomination is not uniform.

SUMMARY OF THE INVENTION

An object of the present invention is to level the frequency of use of respective bill storage boxes when a plurality of bill storage boxes are used as boxes of the same denomination.

The above described object is achieved by features of the present invention described below.

In accordance with a feature of the present invention, a bill storage box wherefrom bills should be separated or wherein bills should be stored is switched to another bill storage box included in the above described plurality of bill storage boxes at every transaction such as deposit or withdrawal.

In accordance with another feature of the present invention, bills respectively stored in the above described plurality of bill storage boxes are compared in quantity at the time of a transaction of withdrawal, and bills are separated from a bill storage box which has been found to have the largest quantity of bills stored therein as a result of the above described comparison.

In accordance with still another object of the present invention, bills respectively stored in the above described plurality of bill storage boxes are compared in quantity at the time of a transaction of deposit and bills are stored into a bill storage box which has been found to store the smallest quantity of bills as a result of the above described comparison.

In accordance with a further object of the present invention, separation or storage of bills with respect to the above described specified bill storage box is started at the time of a transaction of deposit or withdrawal, and a bill storage box wherefrom bills should be separated or wherein bills should be stored is switched to another bill storage box included in the above described plurality of bill storage boxes when separation or storage of a predetermined number of bills has been sensed.

In case there are a plurality of storage boxes of the same denomination, the box to be used is switched by using changeover switches installed in the storage boxes whenever a transaction is started. Even for withdrawal of the same denomination, therefore, the box wherefrom withdrawal is performed is switched at every transaction.

At the time of withdrawal, remainders in boxes of the same denomination are compared by box remainder comparison means, and withdrawal is performed from a box having the largest remainder. On the contrary, bills are stacked into a box having the smallest remainder.

Further, bills of the same denomination are counted during bill conveyance, and the box wherein bills should be stacked or wherefrom bills should be separated is switched at every bill or at every predetermined number of bills.

Even if there are a plurality of boxes of the same denomination, therefore, the boxes are used uniformly.

By thus using a plurality of bill storage boxes of the same denomination uniformly, the following effects are produced.

First of all, wear and a state of lubrication of mechanism elements of the storage boxes are made uniform and the interval of maintenance and inspection is optimized. Together therewith, component lives are also made uniform.

Further, switching to a different box caused by emptiness of a box in the middle of withdrawal is avoided until the remainder of bills of the same denomination becomes a small quantity, and therefore a processing capability is not lowered.

Since remainders of bills in the boxes can be made equal, fullness of bills, a small quantity of remainder or necessity of supplementation can be detected at the same timing.

When bills remaining in a bill storage box becomes a small quantity, it is necessary to supplement the bill storage box which has been found to have a small quantity of remainder with bills supplied from a supplementing bill storage box. Since the present invention makes remainders of bills in a plurality of bill storage boxes of the same denomination uniform, bill supplementation timing also becomes uniform. On the whole, the time required for bill supplementation is reduced as compared with the case where bill storage boxes are supplemented with bills individually.

DESCRIPTION OF THE PREFERRED EMBODIMENTS

Figure 1:
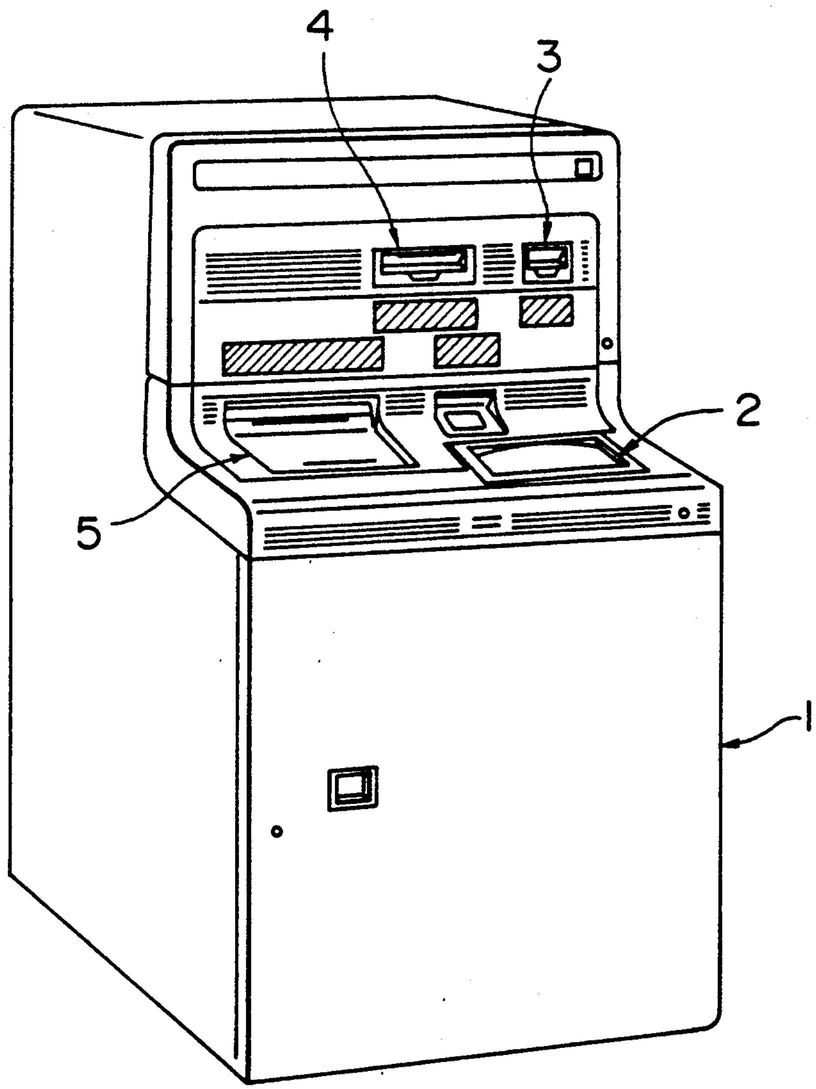
FIG. 1 is an exterior view of an automatic teller machine.

FIG. 1 shows an example of an exterior view of an automatic teller machine whereto the present invention is applied.

An automatic teller machine 1 comprises an operation guidance display and transaction selection touch panel 2, a magnetic card reader/writer 3, a statement slip/passbook printing section 4 and a bill recycle module 5.

The operation guidance display and transaction selection touch panel 2 displays a guidance of operation for customers and allows a customer to select a transaction such as withdrawal and deposit and input an amount of money for the transaction and a secret identification number by touching a displayed picture with a finger in accordance with the above described guidance.

The magnetic card reader/writer 3 is provided to read transaction data such as an account number recorded on a magnetic card inserted by a customer and write predetermined transaction data onto a magnetic card after a transaction has been finished.

The statement slip/passbook printing section 4 is provided to print transaction data such as an amount of money of a transaction onto a record slip, issue the statement slip and print transaction data onto a passbook inserted by a customer.

The bill recycle module 5 is provided to take in and withdraw bills. Only the cover of its entrance is illustrated.

Figure 2:
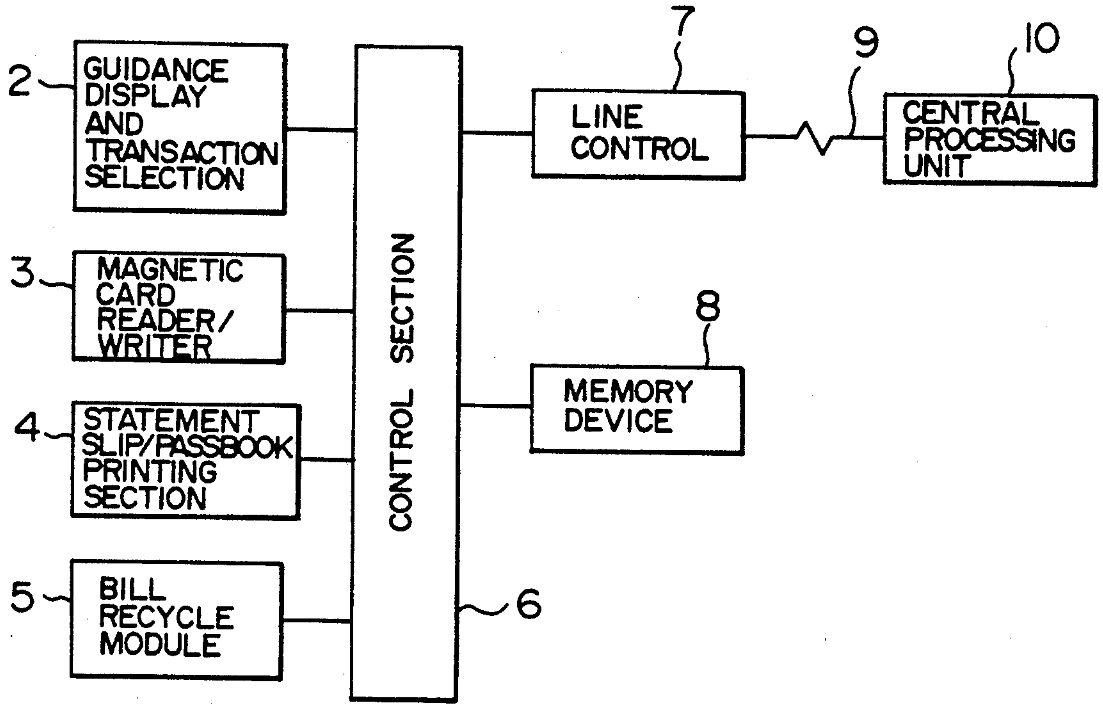
FIG. 2 is a block diagram of the automatic teller machine.

FIG. 2 is a diagram showing the internal device configuration of the automatic teller machine 1. Blocks 2 to 5 correspond to devices shown in FIG. 1 and denoted by like numerals.

A line control section 7 communicates with a central processing unit 10 via a communication line 9. A memory device 8 stores various data relating to transaction processing. A control section 6 includes a microprocessor and controls the above described respective sections to advance transaction processing.

A transaction is selected in accordance with a display on the guidance display and transaction selection touch panel 2. Thereby any one of a withdrawal transaction, a deposit transaction, a balance inquiry and a passbook entry is executed.

Figure 3:
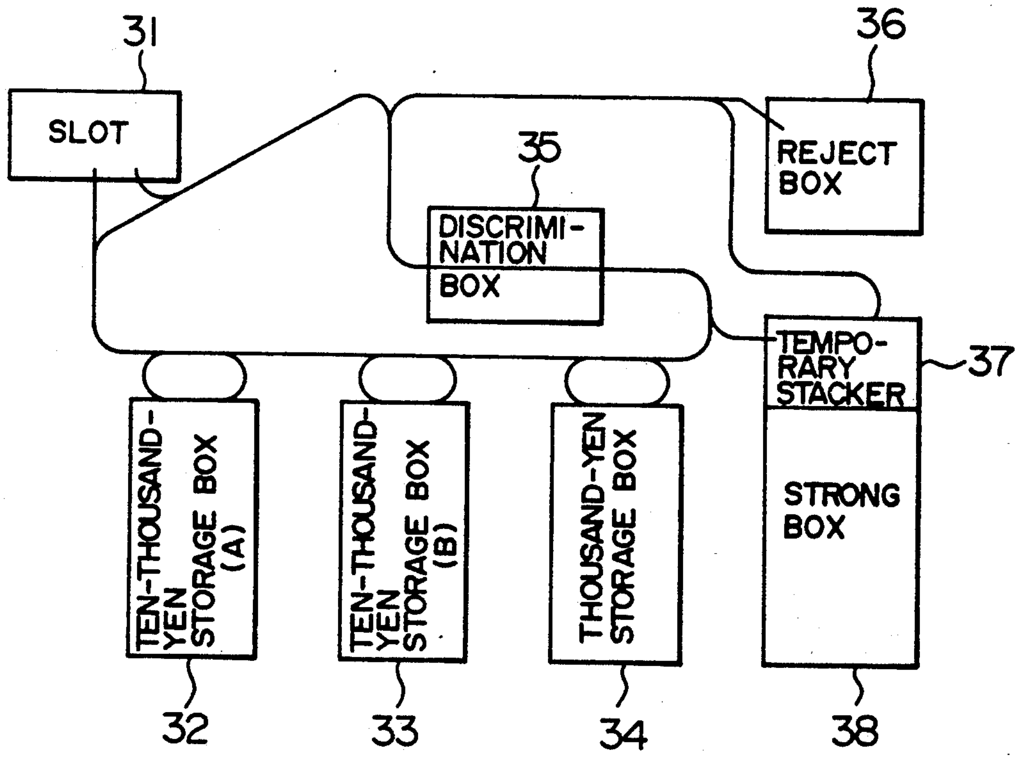
FIG. 3 is a diagram showing details of a bill recycle module included in the automatic teller machine.

FIG. 3 shows details of the bill recycle module 5. This bill recycle module 5 comprises a slot 31 into which bills are inserted or from which bills are ejected, ten-thousand-yen bill storage boxes 32 and 33 for storing ten-thousand-yen bills, a thousand-yen storage box 34 for storing thousand-yen bills, a discrimination box 35 for discriminating true bills from false bills and discriminating denominations of bills, a reject box 36 for storing bills which cannot be discriminated in the discrimination box 35, a temporary stacker 37 for temporarily stacking bills, and a strong box 38 for storing bills of a plurality of denominations collectively.

In initialization (i.e., at the time of commencement of business), the strong box 38 is taken out from the bill recycle module 5. The strong box 38 is then loaded with bills of a plurality of denominations and set within the bill recycle module.

Bills loaded into this strong box 38 are drawn out. Denominations are discriminated in the discrimination box 35. As a result, ten-thousand-yen bills are stored into the ten-thousand-yen bill storage boxes 32 and 33, whereas thousand-yen bills are stored into thousand-yen bill storage box 34.

Operation of the bill recycle module 5 in a deposit transaction will now be described.

When bills to be deposited by a customer are thrown into the slot 31, those bills are drawn out and discriminated. Bills distinguished as true bills are stacked into the temporary stacker 37. Bills distinguished as false bills as a result of discrimination are returned to the slot 31. Under a directive from a customer, bills stacked in the temporary stacker 37 are drawn out. Their denominations are discriminated in the discrimination box 35. Ten-thousand-yen bills are stored into the ten-thousand-yen storage boxes 32 and 33, whereas thousand-yen bills are stored into the thousand-yen storage box 34.

Bills which cannot be discriminated in the discrimination box 35 are stored into the reject box 36.

Operation of the bill recycle module 5 in a withdrawal transaction will now be described.

When an amount of money of withdrawal is inputted by a customer, bills are drawn out from the ten-thousand-yen bill storage boxes 32 or 33 or the thousand-yen bill storage box 34. Their denominations are discriminated in the discrimination box 35, and the bills are ejected into the slot 31. Bills which cannot be discriminated in the discrimination box 35 are stored into the reject box 36.

Operation of the bill recycle module 5 conducted when a remainder of bills in a bill storage box becomes a small quantity will now be described. When the remainder of bills in the ten-thousand-yen bill storage box 32, for example, becomes a small quantity, bills are drawn out from the strong box 38. Denominations of bills are discriminated in the discrimination box 35. Ten-thousand-yen bills are stored into the ten-thousand-yen bill storage box 32.

As shown in FIG. 3, the bill recycle module 5 includes two bill storage boxes (32 and 33) for storing bills of the same denomination (ten thousand yen in the present embodiment). The present invention has a feature that a plurality of bill storage boxes (32, 33) of the same denomination are used uniformly. Operation conducted when the plurality of bill storage boxes are used uniformly will hereafter be described.

Figure 4:
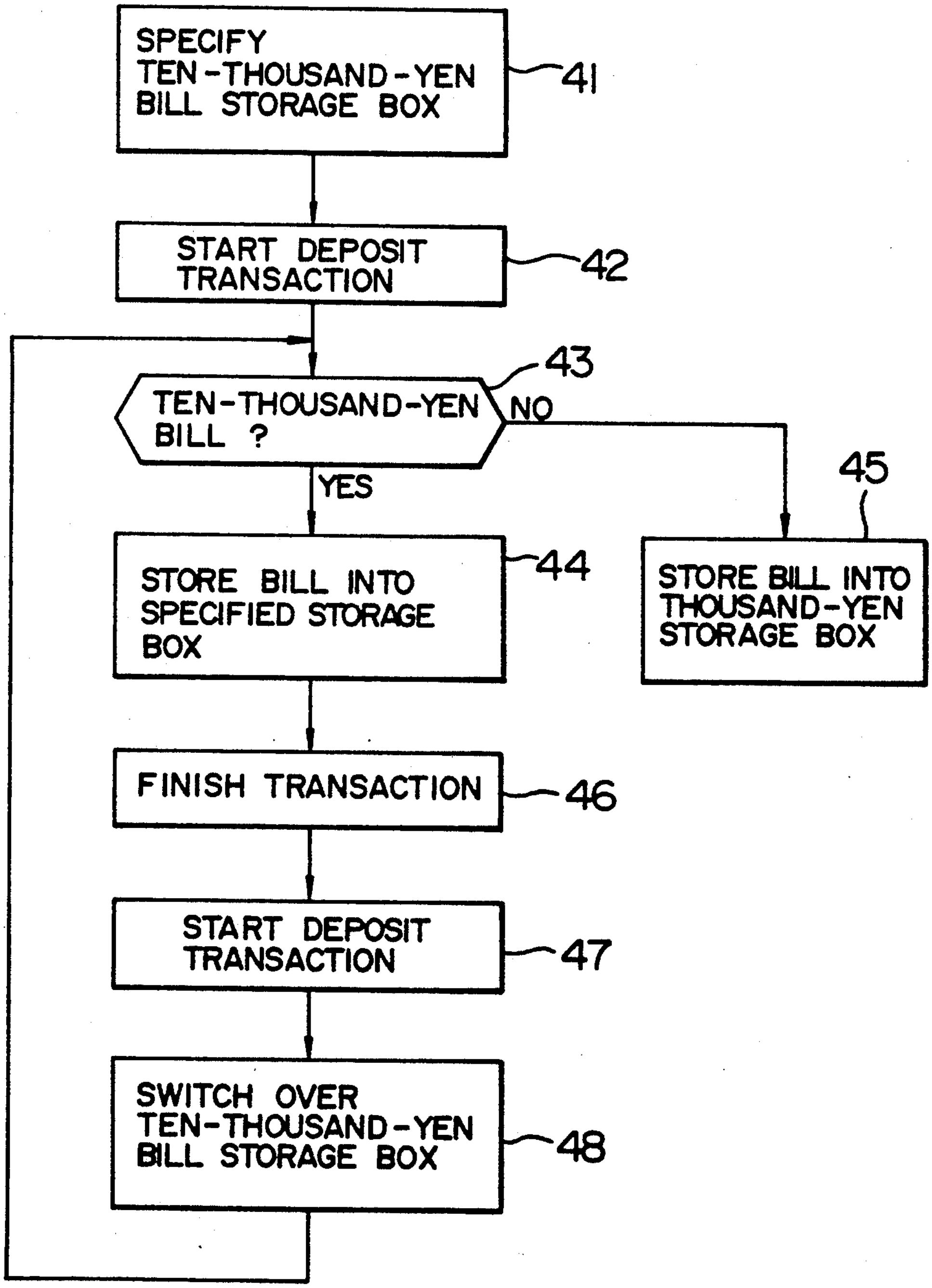
FIG. 4 is a flow chart showing the operation conducted when the bill storage box to be used is switched at every deposit transaction.

First of all, an operation conducted when the ten-thousand-yen bill storage box storing bills is switched between 32 and 33 at every deposit transaction will now be described by referring to FIG. 4.

A bill storage box which should store ten-thousand-yen bills is specified beforehand (step 41). It is now assumed that the ten-thousand-yen bill storage box 32 is specified.

When a deposit transaction is started (step 42), bills thrown into the slot 31 are discriminated in the discrimination box 35. Ten-thousand-yen bills are stored into the ten-thousand-yen bill storage box 32 specified at the step 41 (step 44). If the bill is found not to be a ten-thousand-yen bill as a result of discrimination, it is stored into the thousand-yen storage box 34 (step 45). In this way, a certain deposit transaction is finished (step 46).

When a different deposit transaction is started (step 47), the bill storage box is switched from the ten-thousand-yen bill storage box 32 into which bills were stored in the preceding deposit transition to the ten-thousand-yen storage box 33 into which bills were not stored in the preceding transaction (step 48). Ten-thousand-yen bills are then stored in the ten-thousand-yen bill storage box 33 which is different from the preceding one.

At every deposit transaction, the ten-thousand-yen bill storage boxes 32 and 33 are thus alternately switched to be specified and used for storage. As a result, bill storage boxes 32 and 33 are used uniformaly.

Figure 5:
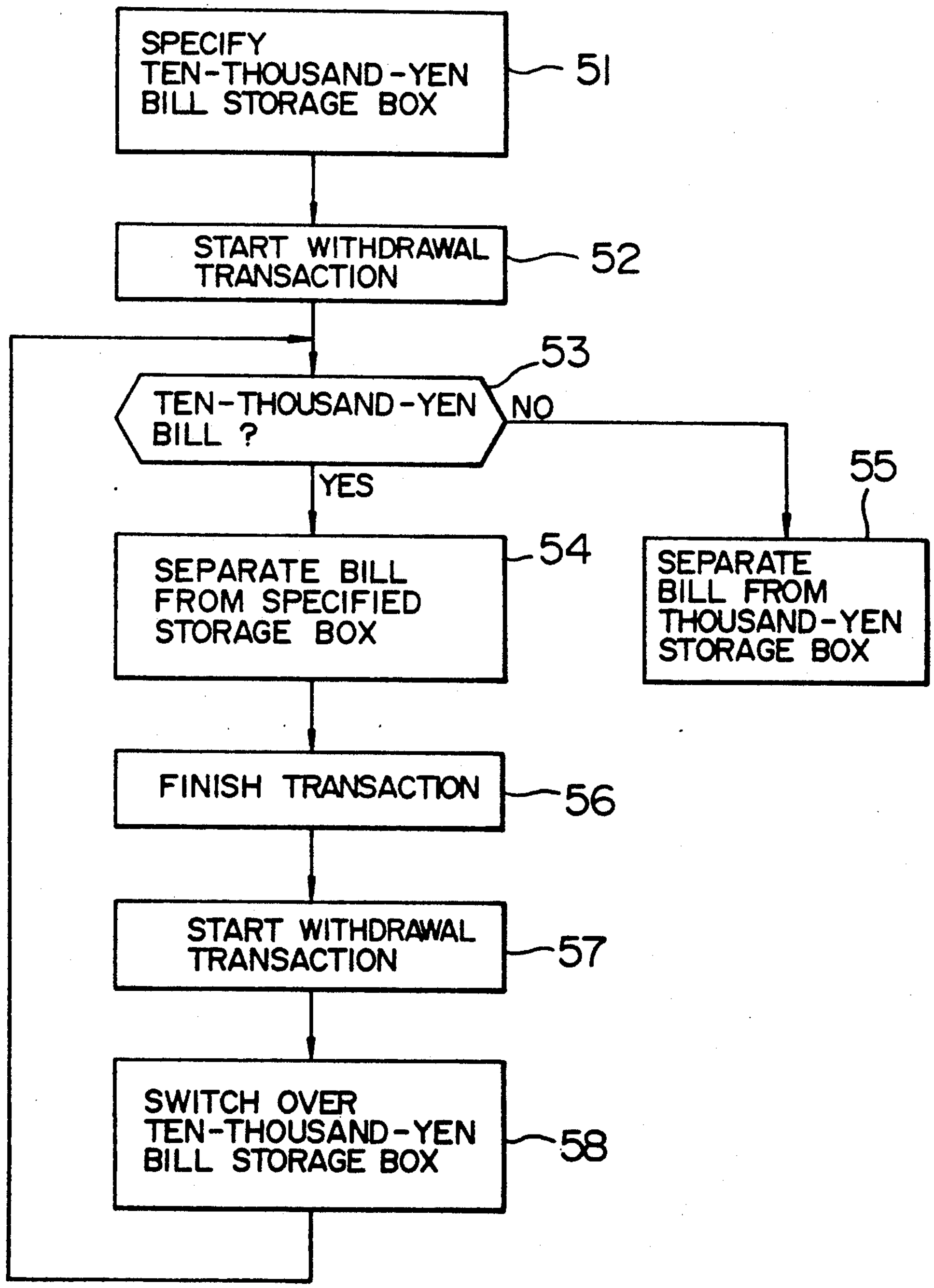
FIG. 5 is a flow chart showing the operation conducted when the bill storage box to be used is switched at every withdrawal transaction.

An operation conducted when the ten-thousand-yen bill storage boxes 32 and 33 are alternately switched to be used for separation at every withdrawal transaction will now be described by referring to FIG. 5.

A bill storage box from which ten-thousand-yen bills should be separated is specified beforehand (step 51). It is now assumed that the ten-thousand-yen bill storage box 32 is specified.

When a withdrawal transaction is started (step 52), it is judged whether ten-thousand-yen bills should be drawn out or not (step 53). In case ten-thousand-yen bills should be drawn out, ten-thousand-yen bills are separated from the ten-thousand-yen bill storage box 32 specified at the step 51 (step 54). In case thousand-yen bills should be drawn out, thousand-yen bills are separated from the thousand-yen bill storage box 34 (step 55). In this way, a certain withdrawal transaction is finished (step 56).

A different withdrawal transaction is now started (step 57). The bill storage box is switched from the ten-thousand-yen bill storage box 32 wherefrom bills were separated in the preceding withdrawal transaction to the ten-thousand-yen bill storage box 33 wherefrom bills were not separated in the preceding transaction (step 58). Ten-thousand-yen bills are thus separated from the ten-thousand-yen bill storage box 33 which is different from the ten-thousand-yen bill storage box 32 used in the preceding transaction.

The ten-thousand-yen bill storage boxes 32 and 33 are thus alternately switched and specified to be used for separation. As a result, bill storage boxes 32 and 33 are used uniformly.

Figure 6:
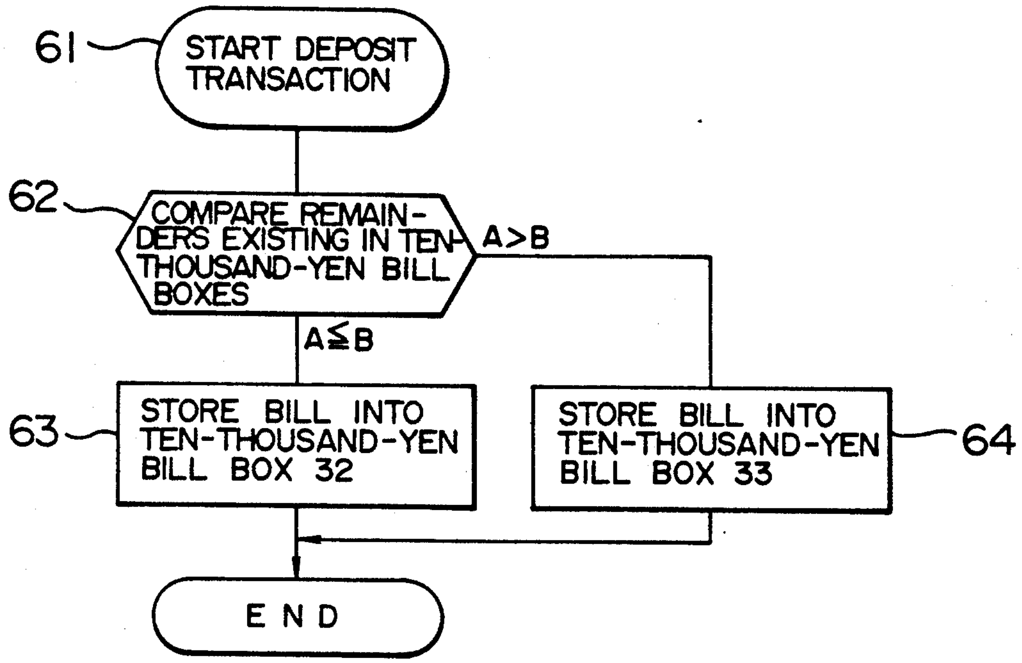
FIG. 6 is a flow chart showing the operation conducted when deposit bills are stored into a bill storage box having a smaller quantity of remainder.

An operation conducted to store ten-thousand-yen bills into a bill storage box having a small quantity of remainder in a deposit transaction will now be described by referring to FIG. 6.

It is now assumed that the remainder of bills stored in the ten-thousand-yen bill storage box 32 has a quantity A and the remainder of bills stored in the ten-thousand-yen bill storage box 33 has a quantity B.

First of all, a deposit transaction is started (step 61). The remainder A of bills stored in the ten-thousand-yen bill storage box 32 is compared with the remainder B of bills stored in the ten-thousand-yen bill storage box 33 (step 62). When the remainder A is smaller in quantity than or equal in quantity to B (i.e., $A \leqq B$), ten-thousand-yen bills deposited are stored into the ten-thousand-yen bill storage box 32 (step 63). When the remainder B is smaller in quantity than the remainder A (i.e., $A > B$), ten-thousand-yen bills deposited are stored into the ten-thousand yen bill storage box 33 (step 64).

In this way, remainders of ten-thousand-yen bills stored in the ten-thousand-yen bill storage boxes 32 and 33 are compared each other at every deposit transaction, and ten-thousand-yen bills are stored into a bill storage box having a smaller quantity of remainder. As a result, ten-thousand-yen bill storage boxes 32 and 33 can be used uniformly in deposit transactions.

Figure 7:
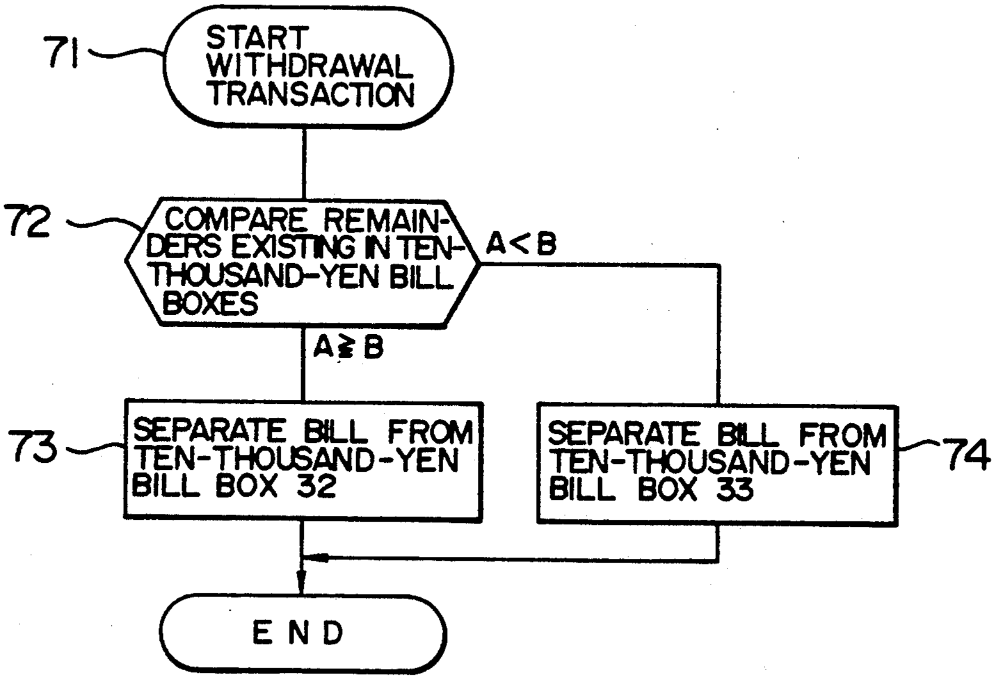
FIG. 7 is a flow chart showing the operation conducted when withdrawal bills are separated from a bill storage box having a larger quantity of remainder.

An operation for separating ten-thousand-yen bills from a bill storage box having a larger quantity of balance will now be described by referring to FIG. 7.

First of all, a withdrawal transaction is started (step 71). The remainder A of bills stored in the ten-thousand-yen bill storage box 32 is compared with the remainder B of bills stored in the ten-thousand-yen bill storage box 33 (step 72). When the remainder A is larger in quantity than or equal in quantity to the remainder B (i.e., $A \geqq B$), ten-thousand-yen bills are separated from the ten-thousand-yen bill storage box 32 (step 73).

When the remainder B is larger than the remainder A (i.e., $A < B$), ten-thousand-yen bills are separated from the ten-thousand-yen bill storage box 33 (step 74).

In this way, remainders of ten-thousand-yen bills stored in the ten-thousand-yen bill storage boxes 32 and 33 are compared each other at every withdrawal transaction, and ten-thousand-yen bills are separated from a bill storage box having a larger quantity of remainder. As a result, ten-thousand-yen bill storage boxes 32 and 33 can be used uniformly in withdrawal transactions.

Figure 8:
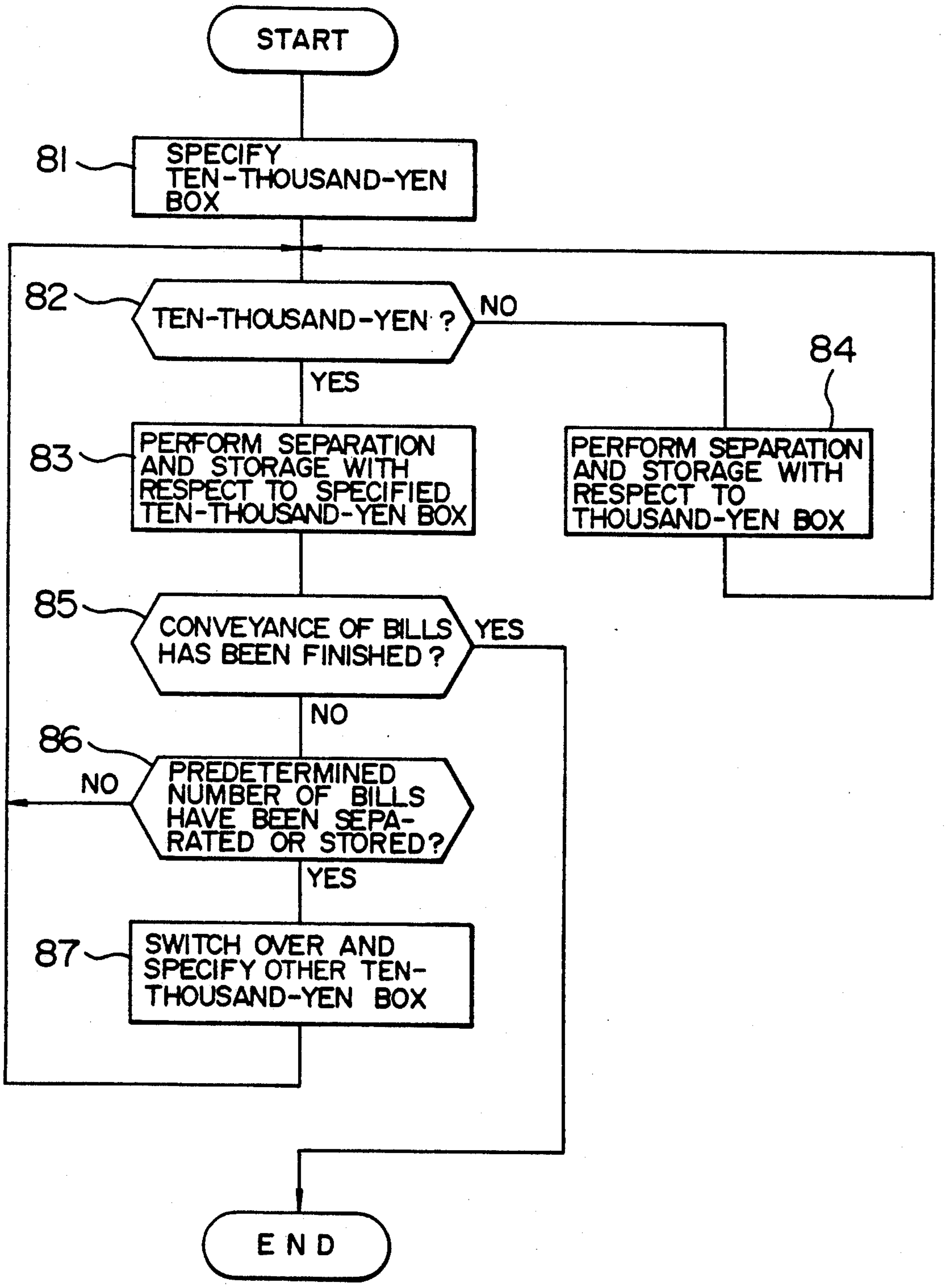
FIG. 8 is a flow chart showing the operation conducted when the bill storage box to be used is switched at every predetermined number of bills.

An operation for switching the bill storage box to be used for storage and separation at every predetermined number of bills during conveyance of bills will now be described by referring to FIG. 8.

A bill storage box to be used for storage and separation of ten-thousand-yen bills is specified beforehand (step 81). It is now assumed that the ten-thousand-yen bill storage box 32 is specified.

It is then judged whether the conveyed bill is a ten-thousand-yen bill or not (step 82). If the conveyed bill is a ten-thousand-yen bill, an operation for separating and storing bills with respect to the ten-thousand-yen bill storage box 32 specified at the step 81 is conducted (step 83). If the conveyed bill has been found to be a thousand-yen bill as a result of the judgment, an operation for separating and storing bills with respect to the thousand-yen storage box 34 is conducted (step 84).

It is then judged whether conveyance of bills deposited or withdrawn has been finished or not (step 85). When all bills have been conveyed, the operation of separation and storage is finished.

If conveyance of bills has not been finished, it is judged whether a predetermined number of bills have been separated or stored (step 86). When a predetermined number of bills have been separated or stored, another ten-thousand-yen bill storage box wherein the separation or storage operation should be conducted is specified (step 87).

That is to say, the ten-thousand-yen bill storage box 33 wherein the operation of separation and storage was not conducted the last time is specified instead of the ten-thousand-yen bill storage box 32 wherein the operation of separation and storage was conducted the last time. The next operation of separation and storage is conducted with respect to the ten-thousand-yen bill storage box 33.

At intervals of a predetermined number of bills, the ten-thousand-yen bill storage boxes 32 and 33 are thus alternately specified to conduct the operation of separation and storage. As a result, ten-thousand-yen bill storage boxes 32 and 33 are uniformly used. In particular, the present embodiment is effective in transactions wherein a large quantity of bills are stored and separated.

The present embodiment has been described on the assumption that there are two ten-thousand-yen boxes. Even when there are three or more boxes and a plurality of boxes of a denomination other than ten-thousand-yen are included, similar control yields the same effect.

What is claimed is:

1. A bill conveyance control apparatus for an automatic teller machine comprising:

a plurality of bill storage boxes for storing bills of a predetermined same denomination;

switching means for successively specifying each of the plurality of bill storage boxes as a bill storage box to be used for deposit/withdrawal, thereby causing said plurality of bill storage boxes to be used substantially uniformly; and means for depositing/withdrawing bills from the bill storage box specified by said switching means;

wherein said switching means includes means for specifying a succeeding one of the plurality of bill storage boxes for each succeeding transaction such as one of deposit and withdrawal.

2. A bill conveyance control apparatus for an automatic teller machine comprising:

a plurality of bill storage boxes for storing bills of a predetermined same denomination;

switching means for successively specifying each of the plurality of bill storage boxes as a bill storage box to be used for deposit/withdrawal, thereby causing said plurality of bill storage boxes to be sued substantially uniformly; and means for depositing/withdrawing bills from the bill storage box specified by said switching means;

wherein said switching means comprises:

means for comparing respective remainders of bills in the plurality of bill storage boxes with each other; and means for specifying one of the plurality of bill storage boxes found to have the smallest remainder of bills as a result of the comparison by said comparing means as a bill storage box to be used for deposit.

3. A bill conveyance control apparatus for an automatic teller machine comprising:

a plurality of bill storage boxes for storing bills of a predetermined same denomination;

switching means for successively specifying each of the plurality of bill storage boxes as a bill storage box to be used for deposit/withdrawal, thereby causing said plurality of bill storage boxes to be used substantially uniformly; and means for depositing/withdrawing bills from the bill storage box specified by said switching means;

wherein said switching means comprises:

means for comparing respective remainders of bills in the plurality of bill storage boxes with each other; and means for specifying one of the plurality of bill storage boxes found to have the largest remainder as a result of the comparison by said comparing means as a bill storage box to be used for withdrawal.

4. A bill conveyance control apparatus for an automatic teller machine comprising:

a plurality of bill storage boxes for storing bills of a predetermined same denomination;

switching means for successively specifying each of the plurality of bill storage boxes as a bill storage box to be used for deposit/withdrawal, thereby causing said plurality of bill storage boxes to be used substantially uniformly; and means for depositing/withdrawing bills from the bill storage box specified by said switching means;

wherein said switching means includes means for specifying a succeeding one of the plurality of bill storage boxes whenever a predetermined number of bills have been one of deposited and withdrawn, and wherein the predetermined number of bills is selected to cause the plurality of bill storage boxes to be used substantially uniformly regardless of a number of bills involved in each of a plurality of successive deposit/withdrawal transactions.

5. A bill conveyance control method for an automatic teller machine including a plurality of bill storage boxes for storing bills of a predetermined same denomination, said method comprising the steps of:

successively specifying each of the plurality of bill storage boxes as a bill storage box to be used for deposit/withdrawal, thereby causing said plurality of bill storage boxes to be used substantially uniformly; and depositing/withdrawing bills from said specified bill storage box;

wherein said specifying step is performed for each succeeding transaction such as one of deposit and withdrawal.

6. A bill conveyance control method for an automatic teller machine including a plurality of bill storage boxes for storing bills of a predetermined same denomination, said method comprising the steps of:

successively specifying each of the plurality of bill storage boxes as a bill storage box to be used for deposit/withdrawal, thereby causing said plurality of bill storage boxes to be used substantially uniformly; and depositing/withdrawing bills from said specified bill storage box;

wherein said specifying step comprises the steps of:

comparing respective remainders of bills in the plurality of bill storage boxes with each other; and specifying one of the plurality of bill storage boxes found to have the smallest remainder as a result of said comparing step as a bill storage box to be sued for deposit.

7. A bill conveyance control method for an automatic teller machine including a plurality of bill storage boxes for storing bills of a predetermined same denomination, said method comprising the steps of:

successively specifying each of the plurality of bill storage boxes as a bill storage box to be used for deposit/withdrawal, thereby causing said plurality of bill storage boxes to be used substantially uniformly; and depositing/withdrawing bills from said specified bill storage box;

wherein said specifying step comprises the steps of:

comparing respective remainders of bills in the plurality of bill storage boxes with each other; and specifying one of the plurality of bill storage boxes found to have the largest remainder as a result of said comparing step as a bill storage box to be used for withdrawal.

8. A bill conveyance control method for an automatic teller machine including a plurality of bill storage boxes for storing bills of a predetermined same denomination, said method comprising the steps of:

successively specifying each of the plurality of bill storage boxes as a bill storage box to be used for deposit/withdrawal, thereby causing said plurality of bill storage boxes to be sued substantially uniformly; and depositing/withdrawing bills from said specified bill storage box;

wherein said specifying step is performed whenever a predetermined number of bills have been one of deposited and withdrawn, and wherein the predetermined number of bill si selected to cause the plurality of bill storage boxes to be used substantially uniformly regardless of a number of bills involved in each of a plurality of successive deposit/withdrawal transactions.

* * * * *